July 7, 1959  M. G. BECK  2,893,722
RESILIENT MOUNTING
Filed Sept. 6, 1957

INVENTOR.
Merrill G Beck
BY
Ralph Hammar
Attorney

2,893,722
RESILIENT MOUNTING

Merrill G. Beck, Erie, Pa., assignor to Lord Manufacturing Company, Erie, Pa., a corporation of Pennsylvania Application September 6, 1957, Serial No. 682,450

1 Claim. (Cl. 267—1)

This invention is a resilient mounting having a generally tubular body of resilient material which in a preferred form has a rigid sleeve bonded at its center. The opposite ends of the body respectively are pressed or slipped through openings in supported and supporting members and are held against the outer surfaces of the members by a through bolt which fully safeties the mounting. At the center of the body is a larger diameter flange or collar-like section interposed between adjacent surfaces of said supported and supporting members and forming the primary load carrying part of the mounting. The through bolt is not directly fixed to either member and its freedom to tilt in any direction imparts lateral flexibility to the mounting.

Figure 1:
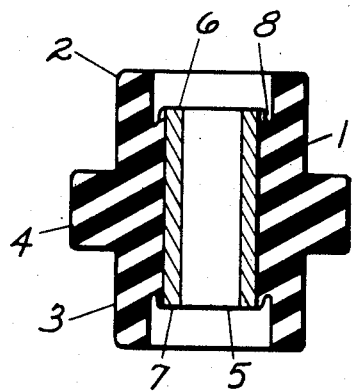
Figure 3:
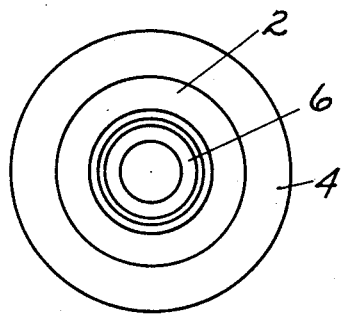
Figure 2:
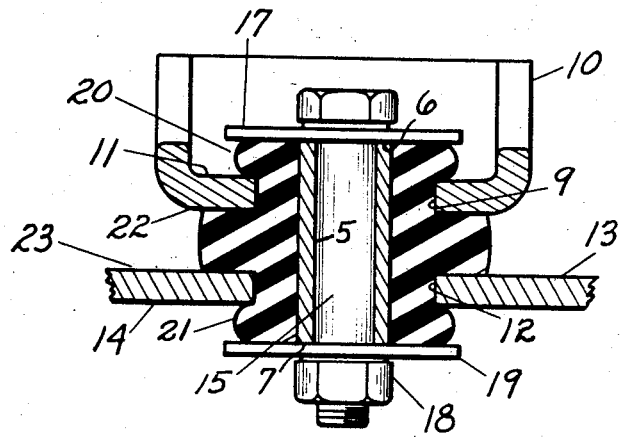

In the drawing, Fig. 1 is a section through the mounting, Fig. 2 is similar section showing the position the mounting assumes when installed, and Fig. 3 is a top view of the mounting.

The mounting consists of a generally tubular body 1 of rubber or like resilient material having midway between its ends 2 and 3 an enlargement in the form of a projecting flange or collar-like section 4. At the center of the body 1 is a rigid tube or sleeve 5 which is shorter than the length of the body and conveniently may be bonded to the rubber body. The ends 6 and 7 of the sleeve 5 terminate short of the ends 2 and 3 of the body and are surrounded respectively by fillets 8. The fillets are important if the rubber is permanently bonded to the sleeve 5 because they prevent stress concentration at the ends of the bond between the rubber and the sleeve and materially increase the useful life of the mounting. The fillets are not necessary if the life of the mounting is not important or if the sleeve 5 is not permanently bonded to the body.

The outside diameter of the end 2 of the body is such as to provide either a press or a slip fit in an opening 9 in a supported member 10. When in place as shown in Fig. 2, both the end 6 of the sleeve and the end 2 of the body project beyond the upper or outer surface 11 of the supported member. The outside diameter of the end 3 of the body is such as to provide either a press or a slip fit in an opening 12 in a supporting member 13 and when installed, as shown in Fig. 2, both the lower end 7 of the sleeve 5 and the end 3 of the body project below the lower or outer surface 14 of the supporting member. The installation is completed by tightening a through bolt 15 having under its head 16 a washer 17 of greater diameter than the hole 9 and having above the nut 18 a washer 19 of greater diameter than the hole 12. The bolt is tightened until the washer 17 and 19 comes solid against the ends 6 and 7 of the sleeves 5 and this causes the projecting ends 2 and 3 of the rubber body to be squeezed radially outward over the outer surfaces 11 and 14 as shown respectively at 20 and 21. The tightening of the bolt also causes the rubber to expand and to completely fill the openings 9 and 12 if any clearance had previously existed. This means that the holes 9 and 12 need not be accurately machined because the installation of the mounting automatically takes up any clearance. It will be noted that the mounting is completely safetied in that the supporting and supported members will be held together even if the rubber is completely destroyed.

The outwardly projecting flange or collar-like section 4 on the rubber body which comprises the primary load carrying portion of the mounting extends between the lower surface 22 of the supported member 10 and the upper surface 23 of the supporting member 13 and engages these surfaces in load carrying relation. Under load, it will be noted that the section 4 is squeezed radially outward. The sleeve 5 prevents inward squeezing of the rubber which would otherwise tend to close the opening for the through bolt. While the section 4 is the primary load carrying section, the center member of the mounting consisting of the through bolt 15 and the parts rigidly clamped thereto does contribute to the flexibility of the mounting. The center member is a floating member which is free to tilt in all directions about any axis transverse to its length and accordingly provides lateral or radial flexibility. The center member in conjunction with the squeezed out sections 20 and 21 also cushions any rebound.

The mounting is easy to make and install and is adaptable to a wide range of load carrying capacities.

What is claimed as new is:

In a resilient mounting, spaced supporting and supported members with aligned holes therein, a one piece generally tubular body of resilient material having between its ends an outwardly projecting collar-like portion interposed in load carrying relation between said members, said collar-like portion being of greater diameter than the holes in said members and engaging the adjacent surfaces of said members around said holes, the ends of the body respectively in the unstressed condition being of substantially the diameter of and projecting through the holes in said members and beyond the outer surfaces of said members around said holes, a rigid sleeve fixed at the center of the body likewise projecting through the holes in said members and beyond said outer surfaces but to a lesser extent than the ends of the body, a through bolt having a washer means at each of its ends squeezed against the ends of said body and sleeve, the ends of said body bulging out over said outer surfaces and providing a cushion shoulder between each of said outer surfaces and the associated washer means.

References Cited in the file of this patent

UNITED STATES PATENTS

| 2,076,034 | Lampman | Apr. 6, 1937 |
| 2,642,253 | Markowitz | June 16, 1953 |
| 2,828,095 | Beck et al. | Mar. 25, 1958 |